W. KIDMAN, Jr.
HARROW.
APPLICATION FILED NOV. 13, 1915.
1,187,998.
Patented June 20, 1916.
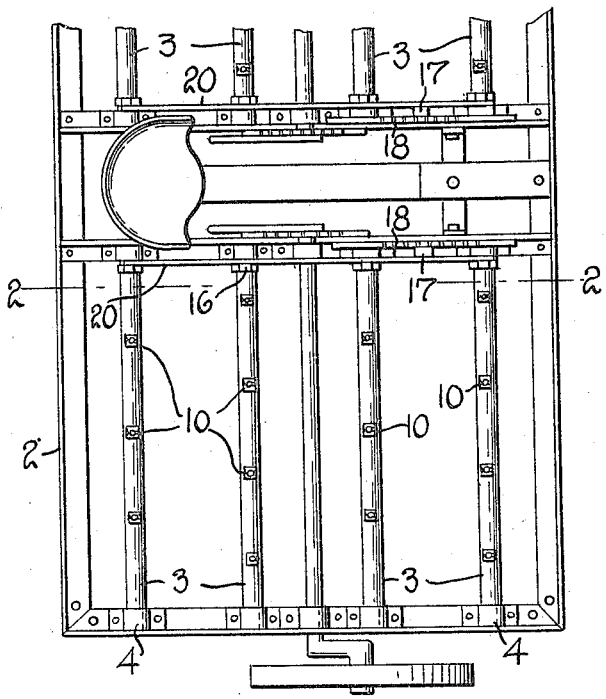
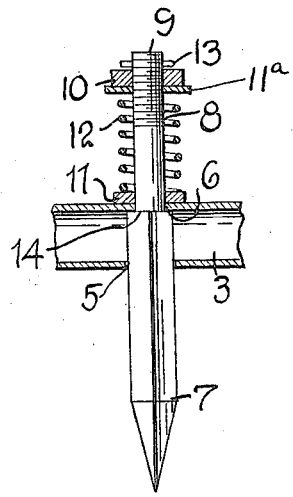
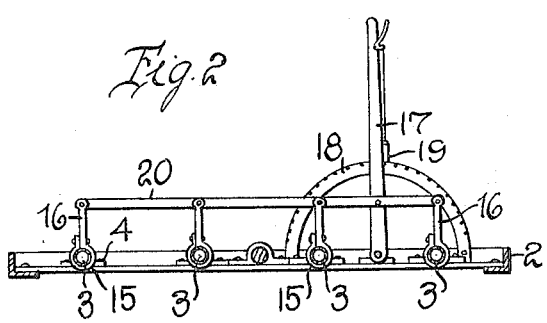
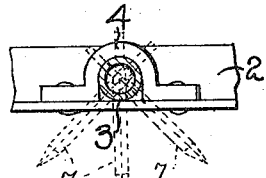
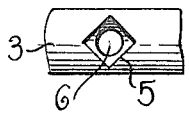
Inventor
W. KIDMAN, Jr.
By Watson E. Coleman
Attorney

UNITED STATES PATENT OFFICE.

WILLIAM KIDMAN, JR., OF MENDON, UTAH.

HARROW.

1,187,998.  Specification of Letters Patent.  Patented June 20, 1916.

Application filed November 13, 1915. Serial No. 61,370.

*To all whom it may concern:*

Be it known that I, WILLIAM KIDMAN, Jr., a citizen of the United States, residing at Mendon, in the county of Cache and State of Utah, have invented certain new and useful Improvements in Harrows, of which the following is a specification, reference being had to the accompanying drawings.

My invention relates to agricultural implements, and particularly to harrows, and the primary object of my invention is to provide means for supporting harrow teeth which may be used in conjunction with the frame of the weed cutter and harrow shown in the patent granted to me, No. 1,167,645, on January 11, 1916.

A further object of the invention is to so mount the harrow teeth in the rocking bars that the teeth may be readily withdrawn and replaced and to provide means whereby the nut holding each tooth in place may be prevented from accidental rotation in a direction to release it and also to provide means whereby the position of the tooth may be rotatably adjusted.

A further object of the invention is to provide a harrow attachment which may be readily applied to or removed from the frame of the machine illustrated in my prior patent above referred to.

My invention is illustrated in the accompanying drawings, wherein;

Figure 1 is a fragmentary plan view of a harrow constructed in accordance with my invention; Fig. 2 is a transverse section on the line 2—2 of Fig. 1; Fig. 3 is a detail sectional view of one of the tooth supporting bars and the harrow tooth mounted thereon; Fig. 4 is a detail elevation of the bearing clip, the tooth supporting bar therein being shown in section; and Fig. 5 is a fragmentary inverted plan view of one of the tooth bars, showing the openings for the reception of the teeth.

Referring to these drawings, 2 designates a supporting frame which is approximately rectangular in plan and preferably formed of angle iron. This frame is supported on wheels which may be raised or lowered so as to elevate or depress the machine and adjust the depth to which the harrow teeth will be projected into the soil. The harrow teeth are carried in a plurality of teeth supporting bars 3. These bars may be cheaply and easily formed of iron pipe. Each of these bars is mounted at its ends in the frame by means of the bearing clips 4. These clips are approximately semi-circular in form, and have outwardly projecting end portions adapted to be bolted to the side bars of the frame 2.

Each of the teeth carrying bars is provided with a plurality of perforations 5 on its under face and a plurality of perforations 6 on its upper face, the perforations 6 being smaller than the perforations 5. The harrow teeth 7 are formed with shanks 8. The teeth proper are many-sided in cross section and are preferably square in cross section, but the shank 8 is rounded in cross section. The opening 5 and the opening 6 are of such size as to receive the rounded shank. The upper end of this shank is screw-threaded, as at 9, for the reception of a nut 10.

Surrounding the shank and resting upon the supporting bar 3, is a washer 11. Disposed between a washer 11$^a$ and this washer 11, is a coil spring 12 which surrounds the shank 8. This spring at its lower end bears against the washer 11 and at its upper end bears against the washer 11$^a$, so that the tension of the spring will exert an upward pressure upon the washer 11$^a$ and upon the nut, resisting any tendency of the nut to rotate off of the bolt and holding the teeth firmly in place, even though the nut be displaced from its normal position.

In harrowing the frame 2 is vertically adjusted by means of the supporting wheels so as to increase and decrease the depth at which the teeth penetrate the ground. As the body of the tooth is many-sided and the lower hole 6 through the tooth bar is also many-sided, it will be obvious that the tooth is held from rotation but that it may be intentionally rotated to present a new face to the work by lowering the tooth so as to disengage it from the square opening 6 and then rotating the tooth to its new position and again engaging it with the square opening.

Each tooth is readily removable from the tubular member 3 and each tooth may be rotated so as to bring a new face toward the front of the machine.

For the purpose of rocking the teeth supporting bars 3 to thus incline the teeth to any desired extent and reverse the inclination of the teeth, I provide each of the tooth supporting bars with a collar 15 which is firmly clamped upon the bar, and has projecting from it an arm 16. Mounted upon the frame of the machine in any suitable manner is the handle lever 17 which operates over a rack or sector 18. The handle is provided with a latch 19 engaging the teeth of the sector so as to hold the handle in any adjusted positions. A link 20 extends from the handle and is pivotally connected to the several arms 16. It will thus be seen that by moving the handle in one direction the several bars will be rotated in one direction which will cause the inclination of the harrow teeth 7, and that all of these teeth will be inclined in the same direction. By this means I propose to adjust the teeth to any inclination desired or to reverse the inclination of the teeth.

While I have particularly designed my harrow attachment to be applied to the frame illustrated in my prior patent above referred to, it is of course obvious that I do not wish to be limited to this, and that the frame 2 may be specifically constructed to support the teeth supporting bars 3 and these bars may be permanently mounted thereon. The teeth on one of the teeth supporting bars 3 are preferably disposed in staggered relation to the teeth on the other supporting bars, but I do not wish to be limited to this.

Having thus described this invention, what I desire to claim, is:—

1. In a harrow, a harrow tooth supporting bar, a tooth mounted therein for vertical movement and having a reduced shank, a spring surrounding the shank, and a nut mounted upon the upper end of the shank and engaged by the spring.

2. In a harrow, a harrow tooth supporting bar having a many-sided opening and a superposed circular opening, a harrow tooth having a many-sided portion and a circular portion respectively engaging the two openings, said harrow tooth being movable in the direction of its own length, and a spring normally retaining the harrow tooth in engagement with said bar and with its many-sided portion in engagement with the many-sided opening but permitting a depression of the harrow tooth in a position wherein the harrow tooth may be rotated to bring a new face into active position.

3. In a harrow, a tubular tooth bar having a relatively large many-sided opening on its under face, and a relatively small circular opening on its upper face, a many-sided tooth inserted through the large opening and having a reduced shank projecting through the small opening, a nut engaging the upper end of the shank, and a spring surrounding the shank and operatively bearing at one end against the tooth bar and at the other end against the nut.

In testimony whereof I hereunto affix my signature in the presence of two witnesses.

WILLIAM KIDMAN, Jr.

Witnesses:
J. A. CROCKETT,
J. EASTMAN HATCH.

Copies of this patent may be obtained for five cents each, by addressing the "Commissioner of Patents, Washington, D. C."